(12) United States Patent
Mandewalkar et al.

(10) Patent No.: US 11,801,457 B2
(45) Date of Patent: Oct. 31, 2023

(54) SELF-TUNING OF POWER UNITS FOR ELECTRICAL SEPARATORS

(71) Applicant: Schlumberger Technology Corporation, Sugar Land, TX (US)

(72) Inventors: Pavan Kumar B. Mandewalkar, Houston, TX (US); Miguel Angel Lopez, Sugar Land, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 60 days.

(21) Appl. No.: 17/755,598

(22) PCT Filed: Nov. 4, 2020

(86) PCT No.: PCT/US2020/058851
§ 371 (c)(1),
(2) Date: May 3, 2022

(87) PCT Pub. No.: WO2021/091990
PCT Pub. Date: May 14, 2021

(65) Prior Publication Data
US 2023/0001330 A1    Jan. 5, 2023

Related U.S. Application Data

(60) Provisional application No. 62/930,961, filed on Nov. 5, 2019.

(51) Int. Cl.
*B01D 17/12*      (2006.01)
*B01D 17/06*      (2006.01)
*B01D 17/02*      (2006.01)

(52) U.S. Cl.
CPC ......... *B01D 17/12* (2013.01); *B01D 17/0214* (2013.01); *B01D 17/06* (2013.01)

(58) Field of Classification Search
CPC .............................. B01D 17/06; B01D 17/12
See application file for complete search history.

(56) References Cited

U.S. PATENT DOCUMENTS 4,400,253 A  *  8/1983  Prestridge .............. B01D 17/06
                                                                204/555
4,606,801 A     8/1986  Prestridge et al.
(Continued)

FOREIGN PATENT DOCUMENTS

CN    102086406 A    6/2011
CN    102086407 A    6/2011
(Continued)

OTHER PUBLICATIONS

International Search Report and Written Opinion issued in PCT Application PCT/US2020/058851, dated Feb. 25, 2021 (9 pages).

*Primary Examiner* — Brian W Cohen

(57) ABSTRACT

Embodiments described herein provide a method of tuning an electrical liquid separator, comprising providing a liquid mixture to a separator; electrically coupling a power unit to the liquid mixture inside the separator; applying a time-varying voltage from the power unit to the liquid mixture; increasing a voltage applied to the liquid mixture from the power unit from a first voltage to a second voltage; detecting an inflection point in a current from the power unit; setting a voltage output range of the power unit to encompass a voltage at which the inflection point was detected.

20 Claims, 5 Drawing Sheets

(56) References Cited

U.S. PATENT DOCUMENTS

| | | |
|---|---|---|
| 2001/0017264 A1 | 8/2001 | Klippel et al. |
| 2008/0156649 A1 | 7/2008 | Sams |
| 2011/0253539 A1* | 10/2011 | Akdim ..................... B03C 3/08 |
| | | 210/708 |
| 2017/0029295 A1 | 2/2017 | Ritchie et al. |
| 2021/0402327 A1* | 12/2021 | Sams ..................... B01D 17/06 |

FOREIGN PATENT DOCUMENTS

| | | | |
|---|---|---|---|
| EP | 3563934 A1 * | 11/2019 | ............. B01D 17/06 |
| WO | 9312856 A1 | 7/1993 | |

* cited by examiner

SELF-TUNING OF POWER UNITS FOR ELECTRICAL SEPARATORS

CROSS-REFERENCE TO RELATED APPLICATION

The present document is based on and claims priority to U.S. Provisional Application Ser. No. 62/930,961, filed Nov. 5, 2019, which is incorporated herein by reference in its entirety.

FIELD

This application generally relates to processing associated with oil and gas extraction. Specifically, this application relates to electrical separators for separable liquids.

BACKGROUND

A common problem in oil and gas extraction is disposal of water produced from hydrocarbon reservoirs. The water is frequently extracted along with hydrocarbon. Hydrocarbon cannot be transported or refined with water, so the hydrocarbon is separated from the water. Often, the water is finely dispersed in the oil phase to form an emulsion that takes time to settle naturally. Measures are thus typically employed to speed the separation.

Electric fields are typically employed to speed separation of oil and water. The water typically has some amount of salt that increases its conductivity and its reaction to the effect of an electric field relative to oil. Electrodes are immersed in the oil water mixture, and power is applied to the electrodes to enhance separation of the phases. Typically, electrostatic separators operate continuously, with a stream of material coming out of a producing hydrocarbon reservoir and being charged to the separator, and streams of separated oil and water coming out of the separator. The stream coming out of the producing hydrocarbon reservoir is often variable and unpredictable, so controlling the separator to avoid breakthroughs of water in the oil, or oil in the water, due to excursions in the properties and composition of the material charged to the separator, is desirable. There is a need for improved methods of controlling electrostatic separators.

SUMMARY

Embodiments described herein provide a method of tuning an electrical liquid separator, comprising providing a liquid mixture to a separator; electrically coupling a power unit to the liquid mixture inside the separator; applying a time-varying voltage from the power unit to the liquid mixture; increasing a voltage applied to the liquid mixture from the power unit from a first voltage to a second voltage; detecting an inflection point in a current from the power unit; setting a voltage output range of the power unit to encompass a voltage at which the inflection point was detected; adjusting a modulation frequency of the time-varying voltage to minimize current flow through the liquid mixture; and adjusting a base frequency of the time-varying voltage to minimize current flow through the liquid mixture.

Other embodiments described herein provide a method of separating a liquid mixture, comprising providing a liquid mixture to a separator; electrically coupling a power circuit comprising a powered electrode to the liquid mixture inside the separator; applying a time-varying voltage to the powered electrode; separating the liquid mixture in the separator into a first effluent and a second effluent; determining a voltage range that maximizes effect of voltage change on current flow through the power circuit; determining a first base frequency that minimizes current flow through the power circuit; determining a first modulation frequency that minimizes current flow through the power circuit; seeking a second base frequency that improves composition of the first effluent or the second effluent; and seeking a second modulation frequency that improves composition of the first effluent or the second effluent.

Other embodiments described herein provide a method of tuning an electrical liquid separator, comprising providing a liquid mixture to a separator; electrically coupling a power unit to the liquid mixture inside the separator; applying a time-varying voltage from the power unit to the liquid mixture; separating the liquid mixture into a first effluent and a second effluent; increasing a voltage applied to the liquid mixture from the power unit from a first voltage to a second voltage; defining an inflection point voltage at which current in the power circuit stops increasing and begins decreasing; setting a voltage output range of the power unit to encompass a voltage at which the inflection point was detected; and setting base frequency and modulation frequency of the power unit to minimize current in the power circuit at a voltage within the voltage output range.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
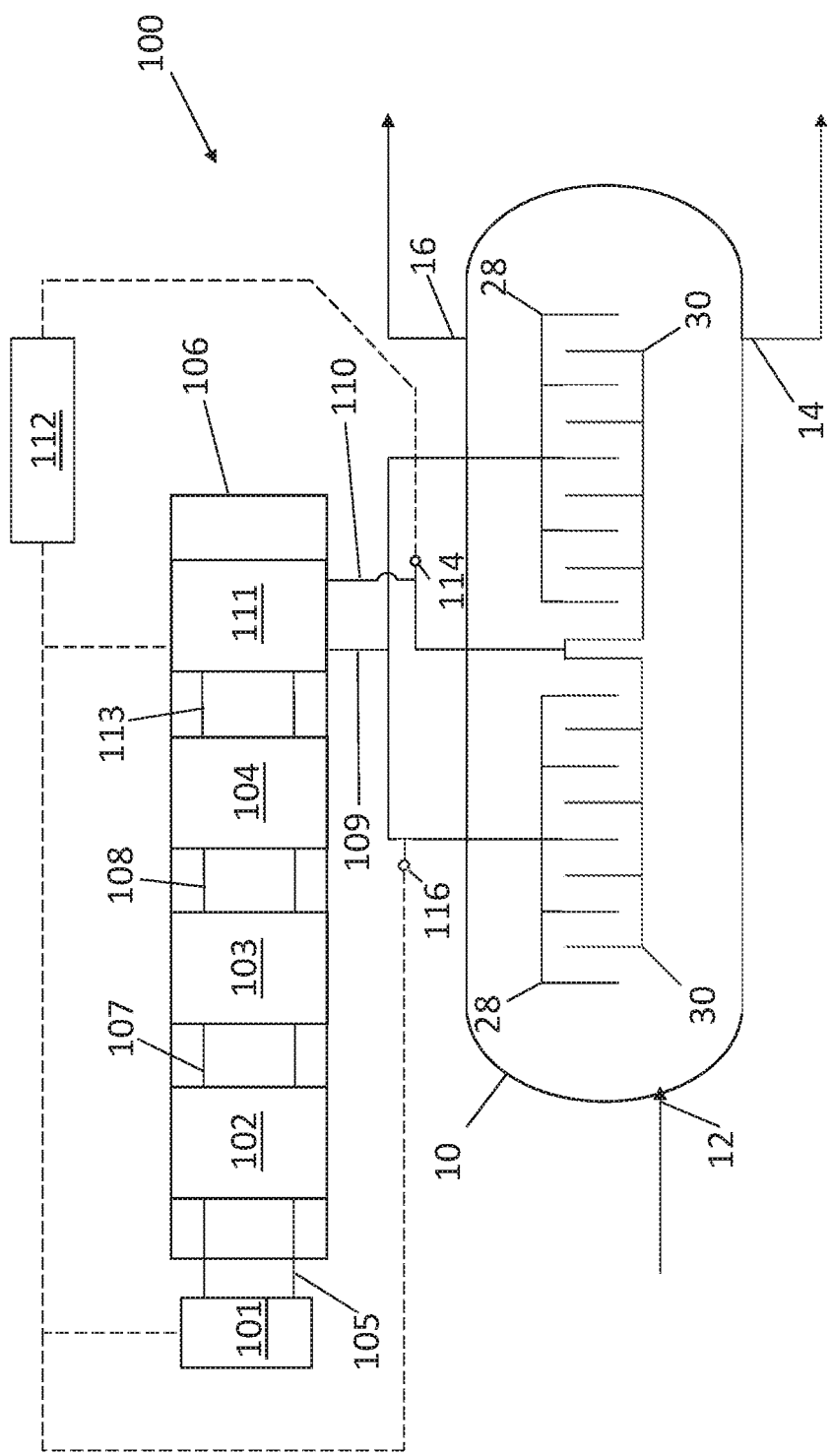
FIG. 1 is a schematic side view of a separation apparatus according to one embodiment.

FIG. 1 is a schematic cross-sectional view of a separation apparatus 100 according to one embodiment. The separation apparatus 100 includes a vessel 10 having an inlet 12, a heavy component outlet 14 and a lighter component outlet 16. The heavy component outlet 14 is usually in a lower part of the vessel 10, and may be at the bottom of the vessel 10. The lighter component outlet 16 is in an upper part of the vessel 10 and may be at the top of the vessel 10. A mixture of heavy and light liquids, which may also include some gas, is provided to the inlet 12, and electrical means are employed in the apparatus 100 to enhance separation of the heavy and light components of the mixture into two phases.

The liquid mixture is typically charged to the vessel 10 using a distributor, which may be positioned at any convenient location within the vessel 10.

The electrical means used to enhance separation of the liquid phases is an electric field applied to the liquid mixture inside the vessel 10. An electrode is immersed in the liquid mixture to apply the electric field, thus creating a voltage within the liquid mixture that enhances the speed with which the liquid phases separate based on the different electrical characteristics of the liquid phases. One electrode may be powered to apply voltage to the liquid mixture. Alternately, as shown in FIG. 1, a plurality of electrodes may be used. The plurality of electrodes may be arranged in one or more pairs, as shown in FIG. 1. Thus, for a given electrode pair, one electrode may be powered while the other is electrically coupled to a reference potential. As shown in FIG. 1, a plurality of powered electrodes 28 are here paired with a plurality of respective reference electrodes 30, where in each pair, the powered electrode 28 is coupled to power and the respective reference electrode 30 is coupled to a reference potential, which may be the same or different in each case. In a single-electrode case, a reference potential may be coupled to the liquid mixture in the vessel 10 using a conductor electrically coupled to the liquid mixture, either as an electrode immersed in the liquid mixture, coupled to the vessel 10, or coupled to one or more of the power sources.

One or more power units 106 apply power to the liquid mixture to create the voltage. Here, one power unit 106 is shown coupled to two powered electrodes 28 in parallel, but more than one power unit can be used. For example, each of the powered electrodes 28 can have a dedicated power unit 106.

In a case where a single power unit 106 is used, the power unit may be coupled to a single electrode or to multiple electrodes immersed in the liquid mixture. The power units 106 here each include a rectifier 102, a modulator 103, a chopper 104, and a transformer 111. Power leads 105 supply primary power to the rectifier 102 via rectifier leads 105, which connect a primary power supply 101 to the rectifier 102. Modulator leads 107 connect the rectifier 102 to the modulator 103. Chopper leads 108 connect the modulator 103 to the chopper 104. Transformer primary leads 113 connect the chopper 104 to the transformer 111. A power conduit 109 supplies power from the transformer 111 to the power electrodes 28. A return conduit 110 connects the reference electrode 30 back to the transformer 111 to complete the power circuit. The rectifier 102, modulator 103, and chopper 104 shape the temporal profile of the voltage applied to the transformer primary leads 113. The transformer 111 steps up the voltage to a level effective to enhance phase separation in the vessel 10.

The powered electrodes 28 acquire an electric potential from the power conduit 109 and energize an electric field within the liquid mixture inside the vessel 10. In this case, each powered electrode 28 is adjacent to a portion of a reference electrode 30. As mentioned above, reference electrodes 30 immersed in the liquid mixture are optional. Also as mentioned above, any number of power electrodes 28 and reference electrodes 30 can be used. Moreover, a different number of powered electrodes 28 can be used from the number of reference electrodes 30, and the powered electrodes 28 can be configured the same as, or differently from, the reference electrodes 30. For example, the powered electrodes 28 and reference electrodes 30 are configured as assemblies of parallel plates extending vertically and into the page in the view of FIG. 1. The powered electrodes 28 and reference electrodes 30 could be oriented horizontally, or angled between horizontal and vertical. Finally, the electrode orientation can be different for powered electrodes 28 and reference electrodes 30. The methods described herein can be used with any electrode orientation, and even using the vessel 10 as the reference electrode.

In one embodiment, two electrodes of an electrode pair are connected to the transformer 113 to receive the alternate half-cycles of the time-varying voltage. The half-cycles may be rectified such that the electrodes receive essentially the same voltage with the same polarity in alternating half-cycles, or the voltage may be full-cycle such that the electrodes receive opposite polarity voltages. The vessel 10 can function as ground in such arrangements. In other AC voltage arrangements, an electrode pair like the power electrode 28 and the reference electrode 30 is used.

The power unit 106 applies voltage to the electrodes 28 using a power supply 101 to shape the pattern of the voltage. The voltage may be substantially constant or may be time-varying. When a time-varying voltage is applied to a power lead 105 of the transformer 102 by the power supply 101, the corresponding secondary circuit (not shown) acquires a time-varying voltage, which propagates to a rectifier lead 107. The rectifier 103 rectifies the voltage, applying a rectified voltage to a chopper lead 108. The chopper 104 modulates application of voltage to the power conduit 109, providing an independent source of time variation, so that base frequency applied to the power lead 105 can be adjusted and modulation frequency applied by the chopper 104 can be independently adjusted.

A waveform can be applied to the power supplied to the power lead 105 by the power supply 101. Waveforms such as sine waves, square waves, sawtooth waves, trapezoidal wave, triangular-shaped waves, exponential waves, logarithmic waves, semi-circular waves, inverse semi-circular waves, or other symmetrical or non-symmetrical shaped waves can be used, with any convenient variation and/or modulation of amplitude, frequency, and waveform, to produce a time-varying voltage. Two electrodes can be powered using time-varying voltages having different waveforms, different frequencies, different amplitudes, and/or different modulations.

It should be noted that multiple power units 106 can be used for one vessel 10. The power units 106 can be independently controlled according to voltage, base frequency, waveform, and modulation frequency.

A current sensor 114 is coupled to the return conduit 110 to sense current flowing in the low energy portion of the power circuit. The current sensor 114 senses current flowing in the power circuit as the electric field established in the fluid inside the vessel 10 works to accelerate separation of the phases. A controller 112 is operatively coupled to the current sensor 114 to receive signals from the current sensor 114 representing current flowing in the return conduit 110. The controller 112 is also operatively coupled to the power unit 106 to control application of power to the electrodes 28. Instead, or additionally, a current sensor can be coupled to the power conduit 109 and operatively coupled to the controller 112. The controller 112 can receive signals from one or both of the current sensors 114 and 116.

The controller 112 here is configured to seek optimal process windows for operating the separator 100. Specifically, the controller 112 is configured to perform methods described herein for establishing effective and efficient operating windows for voltage, base frequency, and modulation frequency by monitoring current flow in the power circuit as the parameters are changed.

Figure 2:
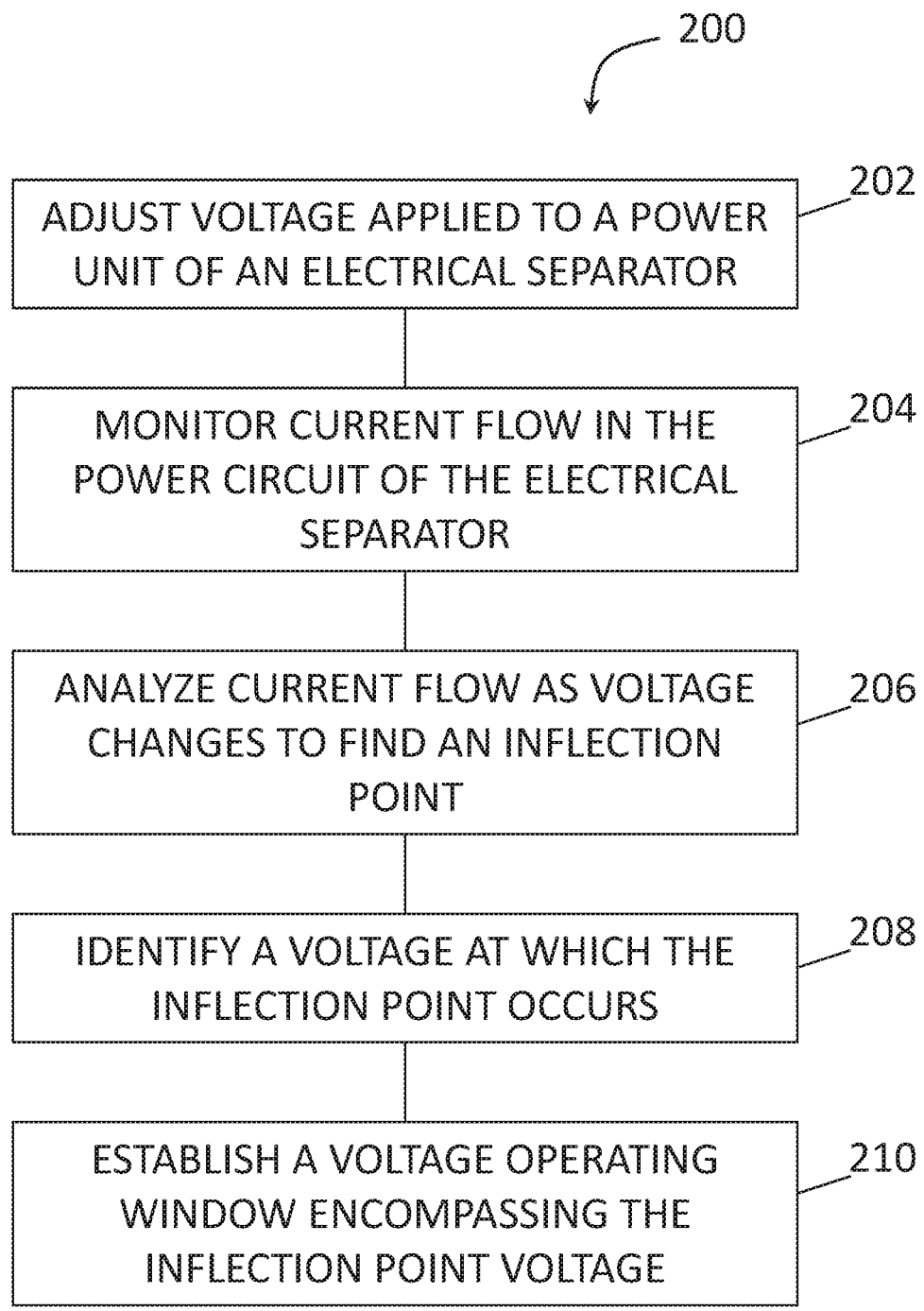
FIG. 2 is a flow diagram summarizing a method according to another embodiment.

Tuning and optimizing such separators is currently done manually by guess work. FIG. 2 is a flow diagram summarizing a method 200 according to one embodiment. The method is a method of operating an electrical separator, such as the electrical separator 100 of FIG. 1. The methods described herein take advantage of the response from the separator when characteristics of the applied voltage are changed. In general, current flowing through the power conduits to the electrodes or the return conduits from the electrodes to the power unit can be monitored to register the process response to the applied voltage. At 202, the voltage applied to the separator by the power unit is changed. The voltage change is applied across a range of voltages thought to encompass an effective and efficient operating window. The voltage may be increased through the range or decreased through the range.

In one version, the voltage is increased, either from a minimum voltage, or from the current voltage set point, to a maximum voltage. The maximum voltage would be either a maximum voltage of a process window or a maximum operable voltage of the power unit. The voltage can be increased steadily, for example linearly according to a programmed rate, such as 1 kV/hour, or the voltage can be increased in steps. The method 200 is geared toward identifying a maximally effective and efficient operating window for the separator. To that end, if prior knowledge suggests a likely range for the operating window, the voltage can be increased from a lower limit of the likely range to an upper limit of the likely range. In other embodiments, the voltage can be increased from a minimum to a maximum at a first rate outside the likely range and a second rate within the likely range, where the second rate is less than the first rate. In other embodiments, the voltage can be increased from a minimum to a maximum in steps with a first step size outside the likely range and a second step size within the likely range, where the second step size is less than the first step size.

Although the operations of the method 200 are generally described in the context of increasing voltage through a test range, the methods can be performed equally well using increasing voltage or decreasing voltage.

At 204, current flowing through the power circuit is monitored as the voltage is changed. The current can be monitored using a current sensor coupled to a conduit delivering power from the power unit to the electrodes in the separator, or the current sensor can be coupled to a return conduit from the electrodes to the power unit. Current flow in either conduit indicates the fluid in the separator is consuming power from the electric field created by applying a time-varying voltage to the electrodes. The current sensors are operatively coupled to a controller, usually including or implemented in a digital processing system. The current sensors send signals to the controller representing the current detected. The controller receives the signals and converts them to digital values of current sensed in the power circuit.

At 206, the current sensed in the power circuit is analyzed by the controller to find an inflection point. Typically, current will increase with applied voltage. Thus, as the voltage applied to the electrodes in the separator increases, the current detected in the power circuit, as described above, increases. The rate of increase with voltage indicates how much power the fluid in the separator is consuming. If a change in voltage produces a small change in current, a low degree of power coupling to the fluid, and thus power consumption by the fluid, is indicated. If a change in voltage produces a large change in current, substantial power consumption by the fluid is indicated, which means the electric field is working to accelerate fluid separation in the separator. The controller can determine a rate of change of the current with the voltage, essentially a derivative of the process response to voltage, by computing a first difference between successive current readings and a second difference between the corresponding voltages, and then computing the ratio of the first difference to the second difference. In most cases, as the voltage applied to the electrodes is increased, this ratio will increase as the electric field couples to the fluid and does increasing work to accelerate separation of the fluid, up to a point. Beyond that point, the ratio declines. The inflection point is the point at which the ratio begins to decline after increasing.

This point is also the point at which the second derivative of current with respect to voltage goes from positive to negative. To compute the second derivative, a third difference between successive ratios computed above can be computed, and a second ratio of the third difference to the first difference, between corresponding voltages, can be computed. The controller can be configured to determine whether, in two successive second ratios, one is above zero and the other is below zero. The inflection point can be found when one second ratio is above zero and a successive second ratio is below zero. The controller can also be configured to compare successive first ratios, and the inflection point can be found if a first ratio is lower than a preceding first ratio.

The controller can also be configured to eliminate or mitigate the effect of noise in the signals representing current and/or voltage. Any convenient method of mitigating noise can be used. For example, averaging successive values can be used to reduce noise. Successive values of sensor readings can be averaged. Successive values of ratios can also be averaged. Outlier data values can be statistically excluded or excluded by limits.

At 208, when the inflection point is identified, a voltage of the inflection point is identified. Any of the voltages used to identify the inflection point can be identified as the voltage of the inflection point. For example, if two first ratios are compared, a minimum among the four voltages used to define the first ratios can be identified as the voltage of the inflection point. Alternately, an average of the four voltages can be used. Noisy voltages can also be excluded from this calculation, as described above. The voltage identified with the inflection point is a favorable operating voltage for the separator because small changes to the voltage have a maximum impact on performance of the separator, as defined by the current response at the inflection point.

At 210, a separator operating window is defined based on the inflection point voltage. The separator operating window is defined by a minimum window voltage below the inflection point voltage and a maximum window voltage above the inflection point voltage. The minimum and maximum window voltage can be defined by a fixed distance from the inflection point voltage, for example ±3 kV from the inflection point voltage, and the fixed distance of the minimum window voltage can be different from the fixed distance of the maximum window voltage. For example, the minimum window voltage can be 3 kV below the inflection point voltage and the maximum window voltage can be 2 kV above the inflection point voltage. The minimum and maximum window voltages can also be defined to encompass a separator operating window that is a predetermined fraction of the operating window of the power unit. For example, if the power unit has an operating window of 10 kV to 60 kV, the minimum and maximum window voltages can be set to encompass 10% of the power unit operating window, which is a range of 5 kV in this case. In any case, the separator operating window can be defined such that the inflection point voltage is centered in the separator operating window, or the separator operating window can be offset such that the inflection point voltage is not centered in the separator operating window. For example, a lower range of the separator operating window between the minimum window voltage and the inflection point voltage can be larger than an upper range of the separator operating window between the maximum window voltage and the inflection point voltage. Alternately, the lower range can be smaller than the upper range. In this way, a separator operating window is defined that provides maximum effectiveness of voltage changes on separator performance.

In one embodiment, the voltage range may be defined by a range of voltages that produce a significant effect on current in the power circuit. The inflection point can be found as described above. A lower limit of the range can be defined by a voltage at which current deviates from a reference current value by a limit value. The reference current value can be predefined, or can be computed from a series of current readings, for example by averaging five readings, or any suitable number of readings. As voltage is increased, current will start to rise when the electric field begins coupling to the fluid in the vessel. When the current rises by a certain amount, as described above, that voltage can be defined as the lower limit. Likewise, an upper limit to the voltage window can be defined when current change drops below a limit, indicating that further increases in voltage have diminishing effect on the separation process.

Figure 3:
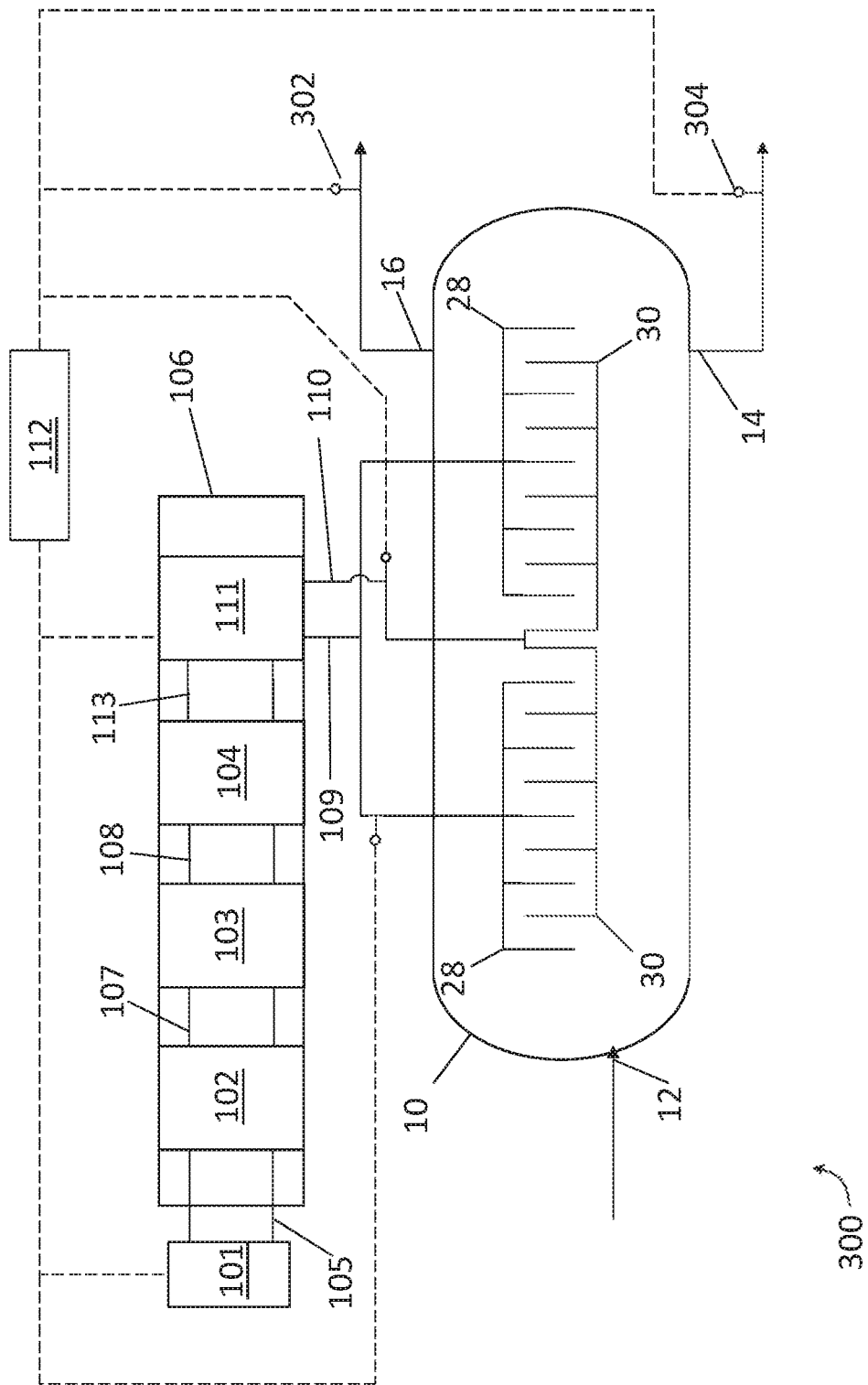
FIG. 3 is a schematic process diagram of a separation system according to another embodiment.

FIG. 3 is a schematic process diagram of a separation apparatus 300 according to another embodiment. The apparatus 300 is similar to the apparatus 100, with the addition of a composition sensor 302 coupled to the lighter component outlet 16 and a second composition sensor 304 coupled to the heavier component outlet 14. The composition sensors 302 and 304 send signals representing quality of the phase separation achieved in the apparatus 300. The composition sensor 302 senses quantity of the heavier component in the lighter component outlet stream 16, and the composition sensor 304 senses quantity of the lighter component in the heavier component outlet stream 14. Each sensor may be electrical, optical, or density sensors. Electrical sensors may be capacitance or conductivity sensors. An optical sensor may be a haze sensor or a turbidity sensor. Density sensors are typically Coriolis type meters or piezoelectric sensors. The sensors are operatively coupled to the controller 112 to send signals to the controller representing the detected composition of the heavier and lighter component outlets 14 and 16.

In this case, the controller 112 is configured to practice methods that additionally analyze response of separation quality, as detected by the composition sensors 302 and 304, to changing voltage, base frequency, and modulation frequency. The controller 112 is configured to automatically activate seek algorithms that adjust the parameters according to any convenient pattern, either within an operating window or seeking a new operating window, to find efficient and effective operating windows for the separation apparatus 300.

Generally the methods described herein, implemented using the apparatus 100 or 300, find the voltage window that where process response to changing voltage is maximum. Such voltage window provides maximum control over separation quality achieved by the electrical separator. Additionally, some methods described herein also find process windows for base frequency and/or modulation frequency that minimize power usage for maximum energy efficiency. When a voltage window is found that maximizes process response, base frequency is varied to find a minimum current, and then modulate frequency is also varied to find a minimum current. Operating windows can be established around these parameters. Finally, voltage, base frequency, and modulation frequency can be varied within the established process windows to improve separation quality as detected by the composition detectors.

Figure 4:
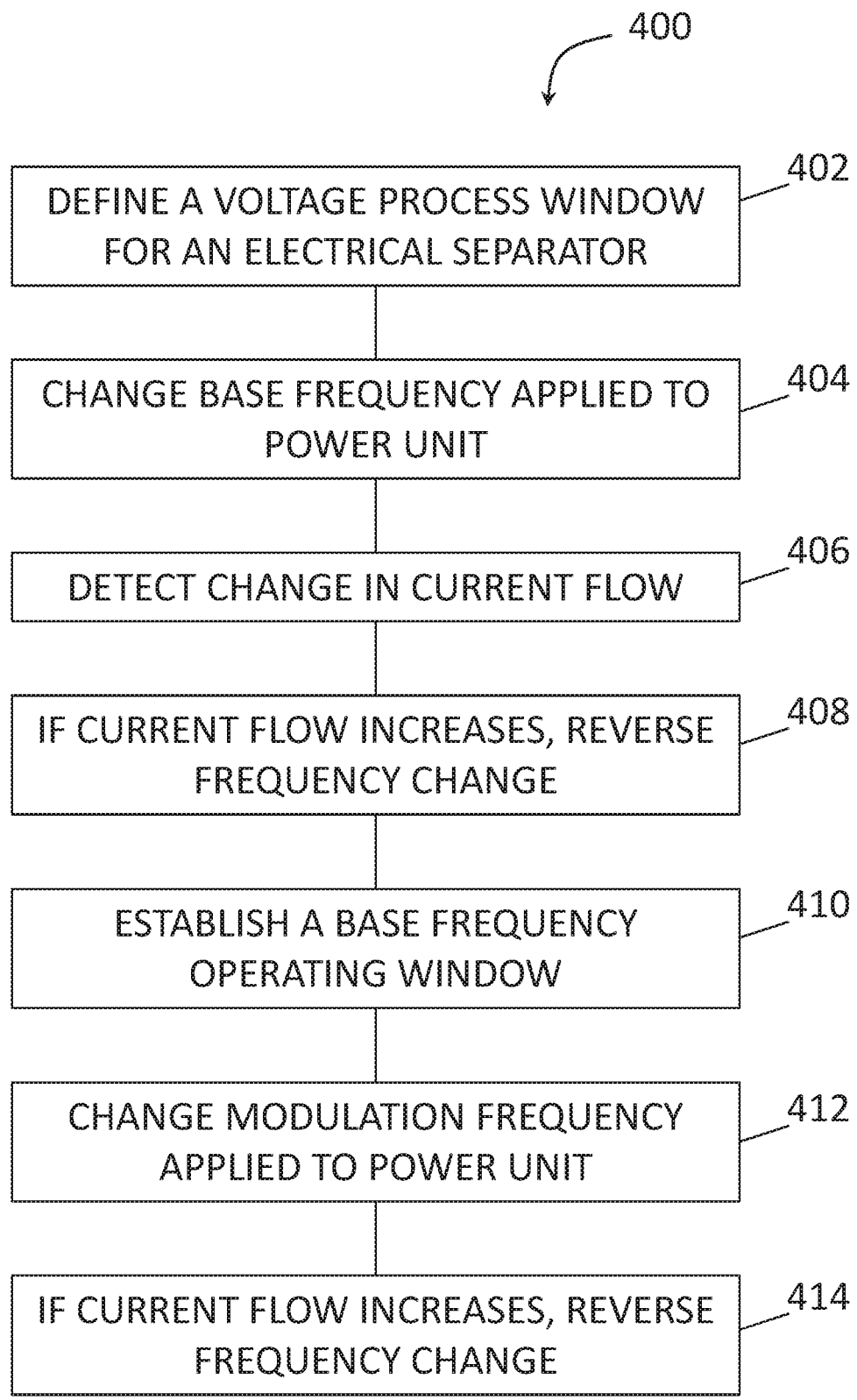
FIG. 4 is a configuration diagram of a separation system according to another embodiment.

FIG. 4 is a flow diagram summarizing a method 400 according to another embodiment. The method 400 is a method of operating an electrical separation apparatus such as the apparatus 100 or 300. At 402, an operating window is defined for voltage using the method 200. At 404, the base frequency of the time-varying voltage applied to the electrodes is changed. The change may be an increase in frequency or a decrease in frequency. The magnitude of the change may be predetermined, or may be random. The magnitude of the change may be selected to have an effect that is at least measurable. The magnitude of the change may be randomly chosen within a predetermined range, such as ±10%.

At 406, a change in current is detected. The change is validated as an effect of the change in base frequency. A threshold may be applied such that any change below the threshold is not identified as a change resulting from the change of base frequency. Noise in the current data may be compensated in any useful way. If no change meeting predefined criteria is detected, the change in base frequency may be repeated or increased.

At 408, a condition of the detected change in current is tested. If the current is found to increase as a result of the base frequency change, the base frequency change is reversed. Operation 404 is then repeated using a base frequency change opposite in sign from the prior change. For example, if the prior change in base frequency was an increase, and current was observed to increase, the increase is reversed and then the base frequency is decreased. An objective of the method 400 is to find a frequency that minimizes current flowing in the power circuit, and thus minimize energy consumption. Thus, the operations 404 and 406 are practiced until a direction of base frequency changes that decrease current flow is defined.

Operations 404, 406 and 408 are repeated until no further decrease in current is observed after a number of base frequency changes. For example, if after three base frequency changes, or after three base frequency changes both upward and downward, no decrease in current is found, a base frequency operating window is established at 410. The last base frequency set in operation 404 can be used as the basis for defining the base frequency operating window, which can be defined as a range above and below the final base frequency. The range can be defined as a fraction of the operable frequency range of the power unit, or may be a magnitude based on the final base frequency. The final base frequency may be centered with the operating window, or not centered.

At 412, modulation frequency is changed in a manner similar to how base frequency was changed. At 414, if current is observed to increase as a result of the modulation frequency change, the change is reversed, as was done with the base frequency to define a direction of modulation frequency changes that reduce current flow. Operations 412 and 414 are repeated until an increase in current flow is detected. When no change results in a decrease in current, a modulation frequency operating window is defined encompassing the final modulation frequency. In this way, the method 400 defines operating windows for voltage, base frequency, and modulation frequency that results in maximum separation effectiveness and efficiency by determining a voltage process window that maximizes effect on separation performance, and by determining base frequency and modulation frequency ranges that minimize current in the power circuit, and therefore energy consumption.

Figure 5:
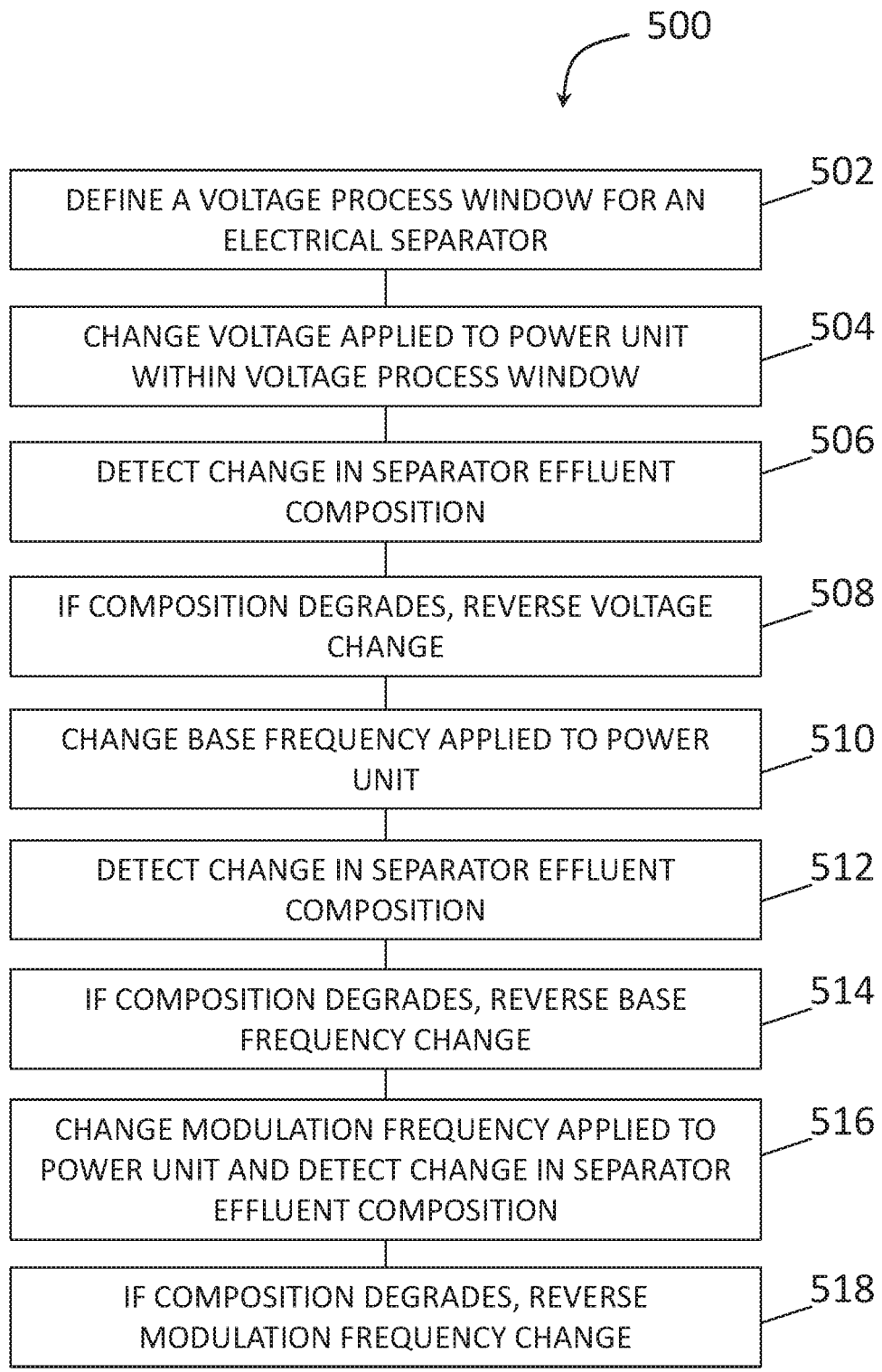
FIG. 5 is a flow diagram summarizing a method according to another embodiment.

FIG. 5 is a flow diagram summarizing a method 500, according to another embodiment. The method of FIG. 5 is a method of improving separation performance of an electrical separator such as the separation apparatus 300 of FIG. 3. At 502, a voltage operating window is defined for the electrical separator, using for example the method 200 of FIG. 2. At 504, after achieving substantially steady operation in the voltage operating window, change the voltage applied to the power unit. The change is of magnitude selected to produce an observable change in separation performance. The change can be an increase or a decrease in voltage, but is within the voltage operating window.

At 506, the separator effluent is analyzed to detect whether the change in voltage produced a change in separation performance. Either effluent stream, the less dense stream or the more dense stream, or both, can be analyzed. A sensor, such as any of the sensors described above, can be used to detect a composition change, or samples can be taken for direct analysis. A wait time is typically imposed before determining that a change in effluent composition is an effect of a voltage change. Typically, at least one residence time, and sometimes two or three residence times, of the separator vessel are used as a wait time.

Once a change has been detected, as a result of the voltage change, a determination is made at 508 whether the separation performance has improved or degraded. If no change is detected, the voltage change of 504 can be increased to observe an effect. If the detected change is a degradation of separation performance, the voltage change is reversed to cancel the deleterious effect of the prior change. Then, a similar voltage change can be made in the opposite direction, expecting improvement in separation performance. The operations 504, 506, and 508 can be repeated as desired to seek a voltage that results in the most improvement in separation performance.

At 510, a similar process can then be followed to find a base frequency of the time-varying voltage that improves separation performance the most. A change is made in base frequency applied to the power unit. The change is again selected to result in an observable change in separation performance. A wait time is imposed for the change to propagate through the vessel. Then, at 512, a change is detected in effluent stream composition, as described above in connection with operation 506. At 514, if the change in effluent stream composition is negative, meaning separation performance has degraded, the change can be reversed, and a change to base frequency in the opposite direction applied at operation 510. The operations 510, 512, and 514 can be repeated as desired to seek a base frequency that results in the most improvement to separation performance.

At 516, a similar process is followed to find a modulation frequency that improves separation performance the most. Modulation frequency is changed and a change in separator effluent composition is detected, similar to the operations above. At 518, if the change in separator effluent composition is deleterious, the change to modulation frequency can be reversed and a similar change made in the opposite direction at 516.

The method 500 can be automatically implemented by a controller. The controller can be configured to perform the method 500 at a scheduled time, or after a certain duration since the last time the method 500 was performed, and can be configured to begin the method 500 only if the separator is in steady operation. The various change sizes and wait times can be configured as constants, or may be configured to depend on process parameters such as flow rate, temperature, or feed composition. The controller can be configured to start the changes in the upward direction or the downward direction.

The controller can also be configured to perform one change to voltage that results in positive change to separator effluent, followed by one change to base frequency and one change to modulation frequency, and then repeat the process until one of voltage, base frequency, or modulation frequency does not result in a positive change. Then, the method 500 can be repeated with single changes, omitting the parameter that did not result in improvement until a second parameter, and then finally the third parameter, reaches a point where no further improvement is detected.

Alternately, the controller can be configured to perform the method 500 by repeating the voltage change process until voltage changes no longer improve performance, and then moving to base frequency changes until no further improvement is observed, and finally moving to modulation frequency until no further improvement is observed. The controller can also be configured to perform the method 500 to completion twice, the first instance being performed by making single positive changes to voltage, base frequency, and modulation frequency in turn, and the second instance being performed by changing voltage until no further improvement is observed, changing base frequency until no further improvement is observed, and then changing modulation frequency until no further improvement is observed.

When composition of both effluent streams from the separator is detected, a change in composition can be registered when a significant change is detected in one effluent stream, or in both effluent streams. A detected change in composition of the less dense stream or the more dense stream can define a composition change for purposes of the methods 400 and 500. Alternately, a detected change in composition of only one stream can be ignored until such time as a change in both effluent streams is detected.

As noted above, determining that a significant change has occurred may be based on magnitude of the change or based on reaching a limit. For example, readings may be analyzed to compute a magnitude of the change, and the computed magnitude compared to a standard to determine whether the change is significant. The magnitude can be computed by computing a reference value before the process change, analyzing a short-term trend, such as five, or any suitable number, of consecutive readings, to determine whether a new steady state has been reached, determining a new value from the steady state, and the computing a difference between the reference value and the new value. In another method, a significant change can be registered if, after the wait time has elapsed, any single reading exceeds a limit, such as a deviation from a reference value before the process change. The reference value can be an average of readings, or may be the last single reading prior to the process change. The deviation may be predetermined, or may be based on process conditions, for example a percentage change.

For separators like the separation apparatus 300 of FIG. 3, with both current sensors and composition sensors, current and composition readings can be defined to determine that a significant change has occurred. For example, if current, low density effluent composition, and high density effluent composition are all detected, a significant change can be registered when a significant change is detected in one, two, or all three parameters. Alternately, a significant change can be registered when current, along with one effluent composition, exhibits significant change. Alternately, a significant change can be registered when both effluent streams register a significant change, where the current reading has not changed significantly.

During performance of any of the tuning methods described herein, a controller can be configured to abort the tuning method if any sensor registers a reading that is outside a tolerance range. The controller can be configured to reset power unit parameters to the last known settings that produced good sensor readings if a process excursion is registered during tuning. The controller can also be configured to resume the tuning method at the point of the process excursion, at the stage of the tuning method where the controller aborted the method, when the sensor readings indicate the excursion has abated.

In some cases, the controller may be configured to increase frequency of sensor readings when a tuning method is commenced. For example, during steady operation, sampling of current and/or composition may be set by the controller at a first sampling frequency, and when a tuning method is started, sampling of current and/or composition may be increased to a second sampling frequency higher than the first sampling frequency. More frequent sampling can help efficiently find process windows that improve separation performance.

While the foregoing is directed to embodiments of the present invention, other and further embodiments of the present disclosure may be devised without departing from the basic scope thereof, and the scope thereof is determined by the claims that follow.

What is claimed is:

1. A method of tuning an electrical liquid separator, comprising:
   providing a liquid mixture to a separator;
   electrically coupling a power unit to the liquid mixture inside the separator;
   applying a time-varying voltage from the power unit to the liquid mixture;
   increasing a voltage applied to the liquid mixture from the power unit from a first voltage to a second voltage;
   detecting an inflection point in a current from the power unit;
   setting a voltage output range of the power unit to encompass a voltage at which the inflection point was detected;
   adjusting a modulation frequency of the time-varying voltage to minimize current flow through the liquid mixture; and
   adjusting a base frequency of the time-varying voltage to minimize current flow through the liquid mixture.

2. The method of claim 1, further comprising adjusting a waveform of the time-varying voltage to minimize current flow through the liquid mixture.

3. The method of claim 1, further comprising adjusting a skew of the time-varying voltage to minimize current flow through the liquid mixture.

4. The method of claim 1, further comprising adjusting a characteristic of the time-varying voltage selected from the group consisting of amplitude modulation, voltage gain, voltage gain modulation, and skew to minimize current flow through the liquid mixture.

5. A method of separating a liquid mixture, comprising:
   providing a liquid mixture to a separator;
   electrically coupling a power circuit comprising a powered electrode to the liquid mixture inside the separator;
   applying a time-varying voltage to the powered electrode;
   separating the liquid mixture in the separator into a first effluent and a second effluent;
   determining a voltage range that maximizes effect of voltage change on current flow through the power circuit;
   determining a first base frequency that minimizes current flow through the power circuit;
   determining a first modulation frequency that minimizes current flow through the power circuit;
   seeking a second base frequency that improves composition of the first effluent or the second effluent; and
   seeking a second modulation frequency that improves composition of the first effluent or the second effluent.

6. The method of claim 5, wherein the composition is detected using a sensor.

7. The method of claim 6, wherein the sensor is an electrical, optical, or density sensor.

8. The method of claim 7, wherein the determining a first base frequency, determining the first modulation frequency, determining the second base frequency, and determining the second modulation frequency are performed using a digital controller.

9. The method of claim 8, wherein the controller is configured to determine when a significant change in composition of the first effluent or the second effluent is attributable to a change in base frequency or modulation frequency.

10. The method of claim 9, wherein the controller is further configured to abort the method if a current or composition reading is outside a tolerance range.

11. A method of tuning an electrical liquid separator, comprising:
    providing a liquid mixture to a separator;
    electrically coupling a power unit to the liquid mixture inside the separator;
    applying a time-varying voltage from the power unit to the liquid mixture;
    separating the liquid mixture into a first effluent and a second effluent;
    increasing a voltage applied to the liquid mixture from the power unit from a first voltage to a second voltage;
    defining an inflection point voltage at which current in the power circuit stops increasing and begins decreasing;
    setting a voltage output range of the power unit to encompass a voltage at which the inflection point was detected; and
    setting base frequency and modulation frequency of the power unit to minimize current in the power circuit at a voltage within the voltage output range.

12. The method of claim 11, wherein setting the voltage output range comprises setting a lower voltage limit at a voltage where current in the power circuit rises from a reference value by a first limit amount and setting an upper voltage limit at a voltage where change in current in the power circuit falls below a second limit amount.

13. The method of claim 11, further comprising seeking a base frequency of the power unit that improves composition of the first effluent or the second effluent.

14. The method of claim 11, further comprising seeking a base frequency and modulation frequency that improve composition of the first effluent or the second effluent.

15. The method of claim 14, wherein the defining the inflection point, setting the voltage output range, and setting base frequency and modulation frequency are performed automatically by a controller.

16. The method of claim 14, wherein the setting base frequency and modulation frequency are performed automatically by a controller according to a tuning frequency when the controller determines that the separation process is stable.

17. The method of claim 14, further comprising seeking base frequency and modulation frequency that improve composition of the first effluent and the second effluent.

18. The method of claim 14, wherein the seeking a base frequency and modulation frequency also reduces current in the power circuit.

19. The method of claim 1, further comprising seeking a voltage within the voltage output range that improves composition of the first effluent and the second effluent.

20. The method of claim 1, further comprising seeking a value of a characteristic of the time-varying voltage selected from the group consisting of amplitude, frequency, amplitude modulation, frequency modulation, base frequency, voltage gain, voltage gain modulation, waveform, and skew that improves composition of the first effluent and the second effluent.

\* \* \* \* \*